(12) United States Patent
Kendall

(10) Patent No.: US 11,738,853 B2
(45) Date of Patent: Aug. 29, 2023

(54) HONEYCOMB CORE FOR A SPAR OF AN UNMANNED AERIAL VEHICLE

(71) Applicant: HAPSMobile Inc., Tokyo (JP)

(72) Inventor: Greg T. Kendall, Simi Valley, CA (US)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/852,368

(22) Filed: Jun. 29, 2022

(65) Prior Publication Data

US 2023/0101667 A1 Mar. 30, 2023

Related U.S. Application Data

(63) Continuation of application No. PCT/JP2020/049269, filed on Dec. 28, 2020.

(60) Provisional application No. 62/975,684, filed on Feb. 12, 2020, provisional application No. 62/954,981, filed on Dec. 30, 2019.

(51) Int. Cl.
*B64C 3/18* (2006.01)
*B64C 39/02* (2023.01)
*B64C 3/22* (2006.01)

(52) U.S. Cl.
CPC .............. *B64C 3/185* (2013.01); *B64C 3/22* (2013.01); *B64C 39/024* (2013.01)

(58) Field of Classification Search
CPC .. B64C 3/185; B64C 3/22; B64C 3/20; B64C 39/024; B64U 20/65
See application file for complete search history.

(56) References Cited

U.S. PATENT DOCUMENTS

| 2009/0121074 | A1  | 5/2009  | Vaneck |
|---|---|---|---|
| 2013/0320142 | A1* | 12/2013 | Nordman .......... B29C 66/72525 |
| | | | 156/60 |
| 2014/0209744 | A1  | 7/2014  | Marcoe |
| 2014/0252156 | A1* | 9/2014  | Hiebl ........................ B64C 9/00 |
| | | | 244/3 |
| 2017/0203839 | A1* | 7/2017  | Giannini ................... B64C 5/16 |

FOREIGN PATENT DOCUMENTS

WO 2018234797 A1 12/2018

OTHER PUBLICATIONS (ISA/237) Written Opinion of the International Search Authority for International Patent Application No. PCT/JP2020/049269, issued/mailed by the Japan Patent Office dated Mar. 23, 2021.

* cited by examiner

*Primary Examiner* — Rodney A Bonnette

(57) ABSTRACT

Systems, devices, and methods including a wing panel; a spar disposed in the wing panel, where the spar comprises: an upper cap; a lower cap; a honeycomb core connected between at least a portion of the upper cap and the lower cap; an inner face sheet; and an outer face sheet, where at least a portion of the honeycomb core is disposed between the inner face sheet and the outer face sheet.

19 Claims, 5 Drawing Sheets

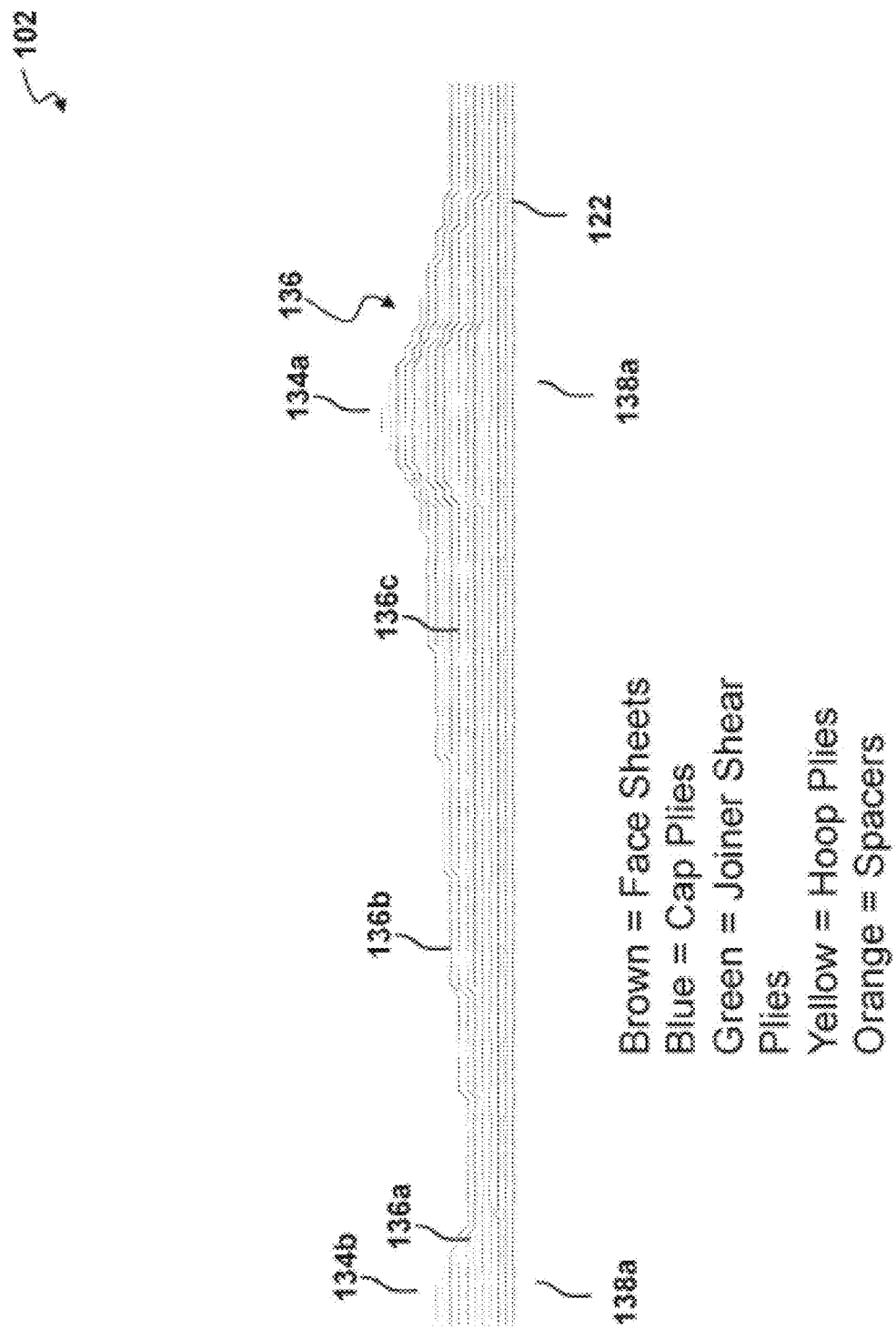

HONEYCOMB CORE FOR A SPAR OF AN UNMANNED AERIAL VEHICLE

CROSS-REFERENCE TO RELATED APPLICATIONS

The application claims priority to and the benefit of U.S. Provisional Patent Application No. 62/954,981 filed in US on Dec. 30, 2019, U.S. Provisional Patent Application No. 62/975,684 filed in US on Feb. 12, 2020, and NO. PCT/JP2020/049269 filed in WO on Dec. 28, 2020, the contents of all of which are hereby incorporated by reference herein for all purposes.

TECHNICAL FIELD

Embodiments relate generally to wing structures, and more particularly to a honeycomb core for a spar of an unmanned aerial vehicle.

BRIEF DESCRIPTION OF DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 5 depicts a cross-sectional view of a layup of plies associated with the spar of FIG. 4.

DESCRIPTION OF EMBODIMENTS

Figure 1:
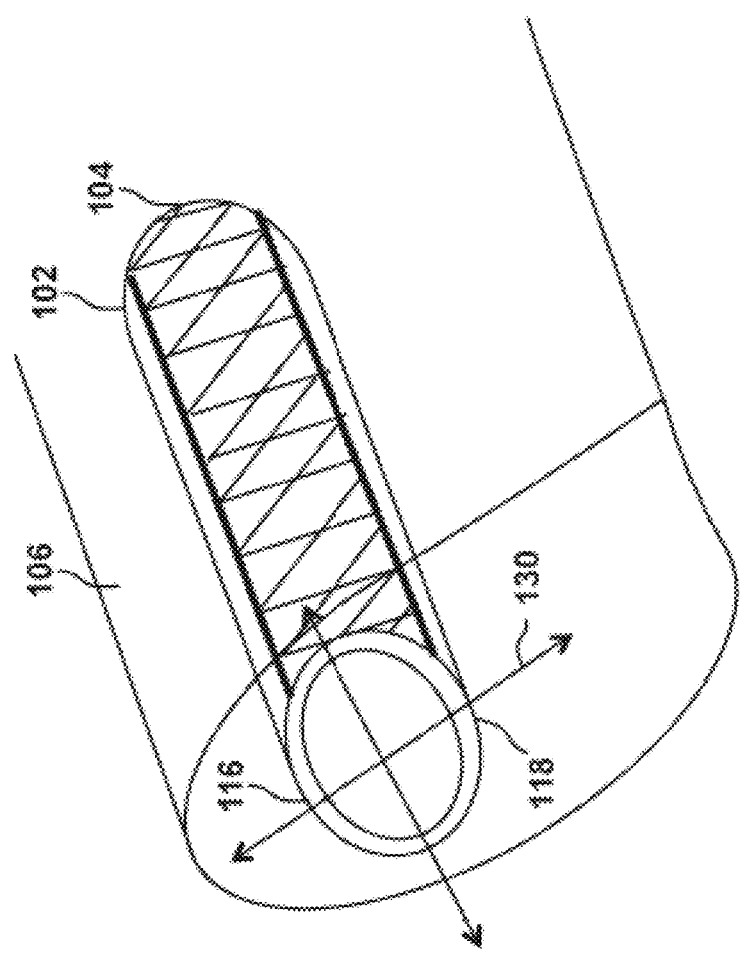
FIG. 1 depicts a top perspective view of a wing panel of an unmanned aerial vehicle with a spar having a honeycomb core.

With respect to FIG. 1, a wing panel 100 of an aerial vehicle, such as an unmanned aerial vehicle (UAV), with a spar 102 having a honeycomb core 104 is depicted. UAVs are aircraft with no onboard pilot and may fly autonomously or remotely. In one embodiment, the UAV is a high altitude long endurance aircraft. In one embodiment, the UAV may have one or more motors, for example, between one and forty (40) motors, and a wingspan between one hundred (100) feet and four hundred (400) feet. In one embodiment, the UAV has a wingspan of approximately two hundred sixty (260) feet and may be propelled by a plurality of propellers coupled to a plurality of motors, for example, ten (10) electric motors, powered by a solar array covering the surface of the wing, resulting in zero emissions. Flying at an altitude of approximately sixty five thousand (65,000) feet above sea level and above the clouds, the UAV is designed for continuous, extended missions of up to months without landing.

The UAV functions optimally at high altitude and is capable of considerable periods of sustained flight without recourse to land. In one embodiment, the UAV may weigh approximately three thousand (3,000) lbs.

The wing panel 100 may include a light-weight, semi-rigid shell 106 that serves as an aerodynamic fairing. The spar 102 may include an upper cap 116, a lower cap 118, and side walls comprised of an inner face sheet 122, the honeycomb core 104, and an outer face sheet 124. In one embodiment, the honeycomb core 104 and outer face sheet 124 go around the entire circumference of the spar 102. In one embodiment, the honeycomb core 104 and outer face sheet 124 extend slightly past the edges of the upper caps 116 and lower caps 118 and overlap onto the upper caps 116 and lower caps 118. The spar 102 may be of varying thickness, such that the spar 102 may be thickest at the upper cap 116, thinner on the lower cap 118, and some other thickness on the sides with the honeycomb core 104. The upper caps 116 and lower caps 118 may be sized according to load, and the thickness of the upper caps 116 and lower caps 118 may vary along the span of the spar 102. In one embodiment, the upper cap 116 thickness varies from 0.294 inches to 0.048 inches and the lower cap 118 thickness varies from 0.162 inches to 0.030 inches. In one embodiment, the honeycomb core 104 thickness is 0.375 inches thick inboard and 0.250 inches thick outboard.

The honeycomb core 104 allows for stabilizing the otherwise thin side areas of the spar 102. The sandwich formed by the core 104 and the inner and outer face sheets 122, 124, respectively of the spar 102 provides higher moment of inertia, hence more side wall stability that results in more overall strength of the spar 102. More specifically, the honeycomb core 104 stabilizes the cross section of the spar 102 against flexing of the spar 104 walls, such that the spar 102 may withstand positive and negative out-of-plane bending loads about a chordwise principal axis 130 placed on the spar 102. The upper cap 116 is generally of greater thickness than the lower cap 118 because the positive out-of-plane bending moments typically are of a larger magnitude than the negative out-of-plane bending moments. Furthermore, the upper cap 116 is also generally of greater thickness than the lower cap 118 because the material of the upper cap 116 and the lower cap 118 is better at taking tensile stress than compressive stress.

Figure 2:
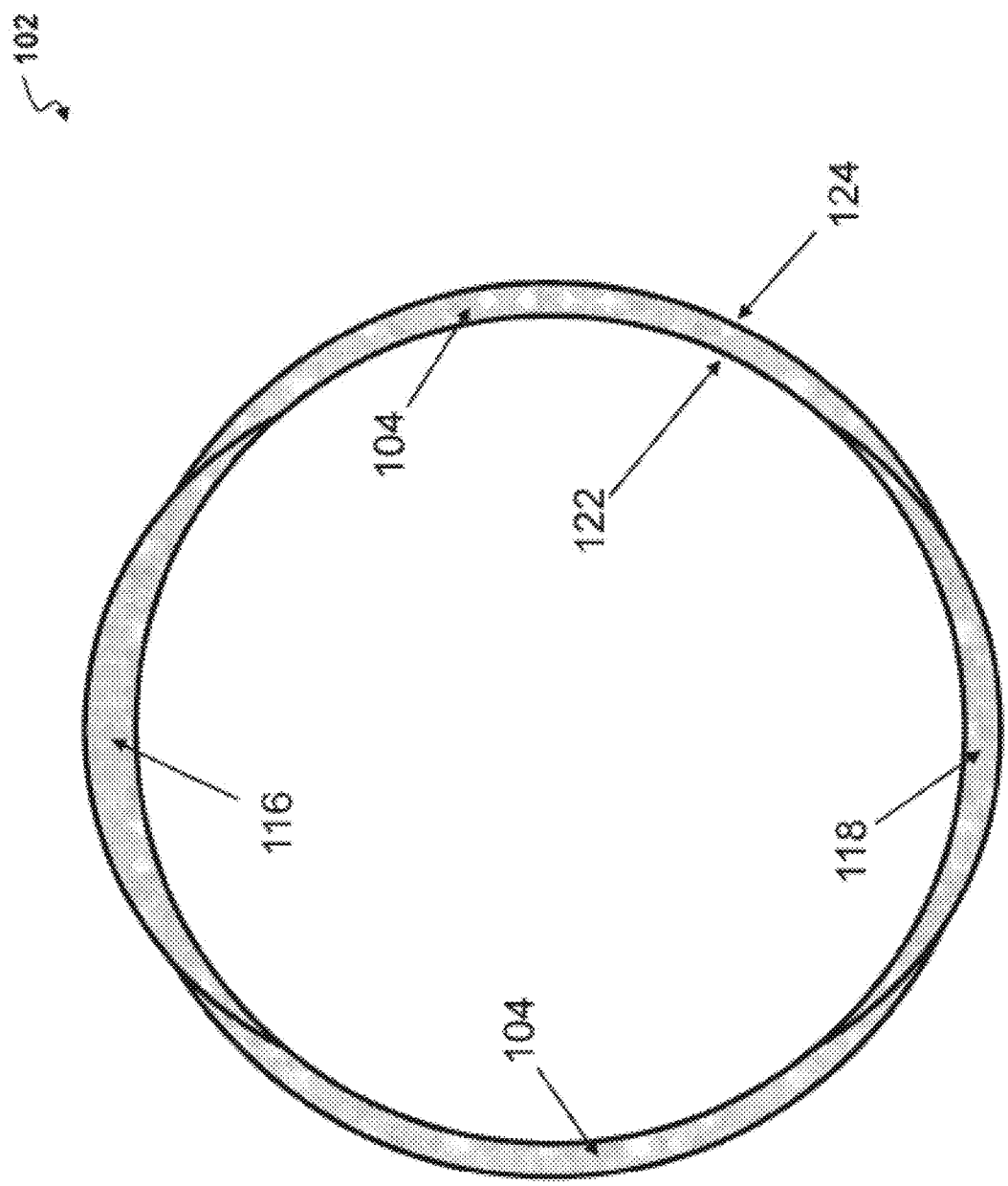
FIG. 2 depicts a cross-sectional view of the spar and honeycomb core of FIG. 1.

With respect to FIG. 2, the spar 102 with the honeycomb core 104 is shown in cross-section. In one embodiment, the spar 102 is generally cylindrical as a result of being laid up on a cylindrical male mandrel. Generally, internal stresses caused by non-uniform thickness around the circumference of the spar 102 will result in a slightly oval cross-section of the spar after removal from the mandrel. In one embodiment, the spar 102 is made of carbon fiber. In one embodiment, the honeycomb core 104 is made of lightweight, low-density, corrugated aramid fibers, such as Kevlar (or Nomex). In another embodiment, the core is made of foam.

The spar 102 may be manufactured with a cylindrical mandrel to shape the spar 102. Sheets (e.g., plies) of carbon fiber may be laid down to form the inner face sheet 122 and the upper and lower caps 116, 118, respectively. In one embodiment, the inner face sheet 122 and caps 116,118 are cured before applying the honeycomb core 104. The honeycomb core 104 may then be wrapped around the thin areas on the side of the spar 102 and the outer face sheet 124 applied such that the honeycomb core 104 is sandwiched between an inner face sheet 122 and an outer face sheet 124. Generally speaking, a plurality of carbon fiber face sheet plies 136 (see FIG. 5) are wrapped around the spar 102 and the cap plies are stretched along its length until the desired thickness is achieved; therefore, the upper portion of the spar 102 may get more plies than the bottom and side portions, due to the greater desired thickness in order to withstand compression loads associated with positive out-of-plane bending. In one embodiment, the inboard ends of the caps (including the upper cap 116 and lower cap 118) of the spar 102 may be approximately twice as thick as the outboard ends of the caps (depending on load).

Figure 3:
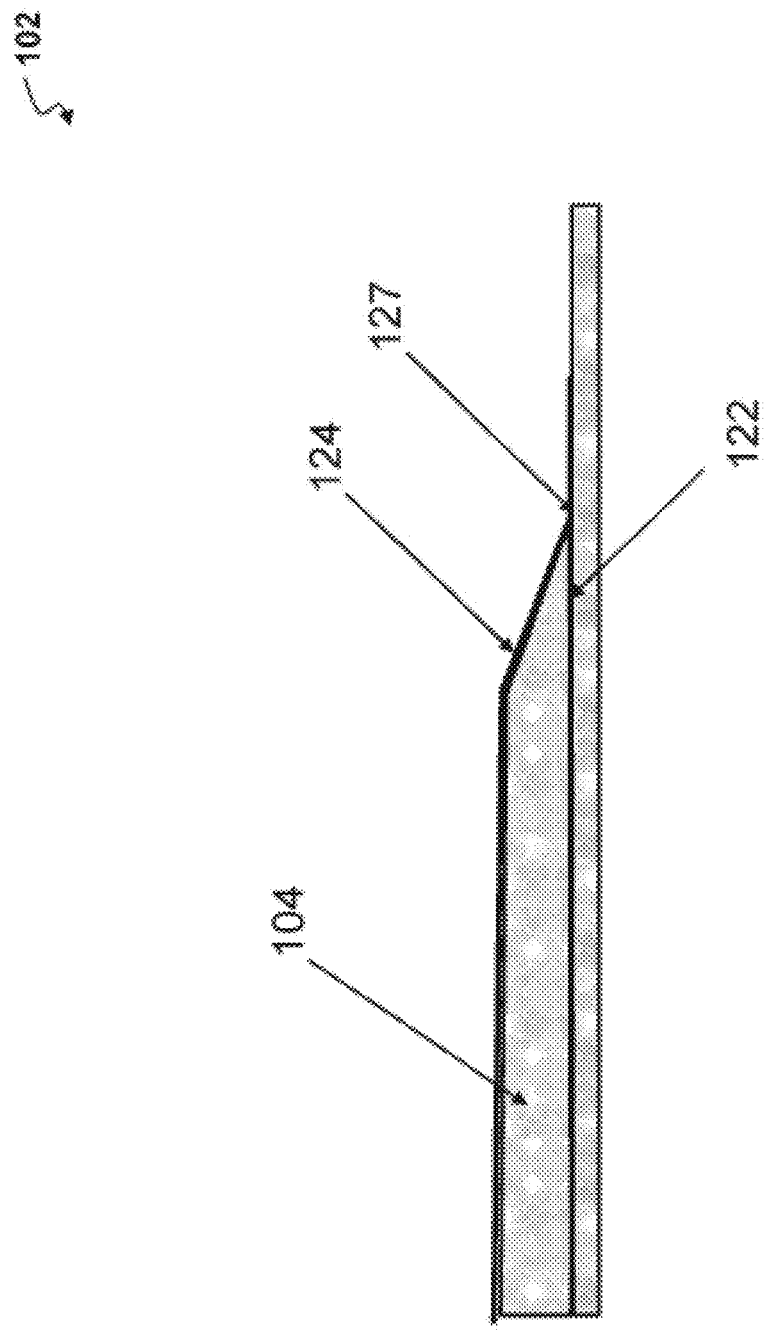
FIG. 3 depicts a cross-sectional, partial view of beveled edges of the honeycomb core of FIG. 1.

FIG. 3 shows the thickness of the honeycomb core 104 beveled or "panned down" at the edges; such that the outer face sheet 124 ramps down from the top of the honeycomb core 104 to the level of a base 127. At this junction, the outer face sheet 124 and the inner face sheet 122 come together and the honeycomb core 104 is no longer needed since there is sufficient stability at the caps 116, 118. Additional stability is provided at the other "buildups" in places along the length of the spar 102. Said buildups may include reinforcements associated with, for example, wing panel spar joints, payload mounts, motor pylon mounts, and landing gear pod mounts.

Figure 4:
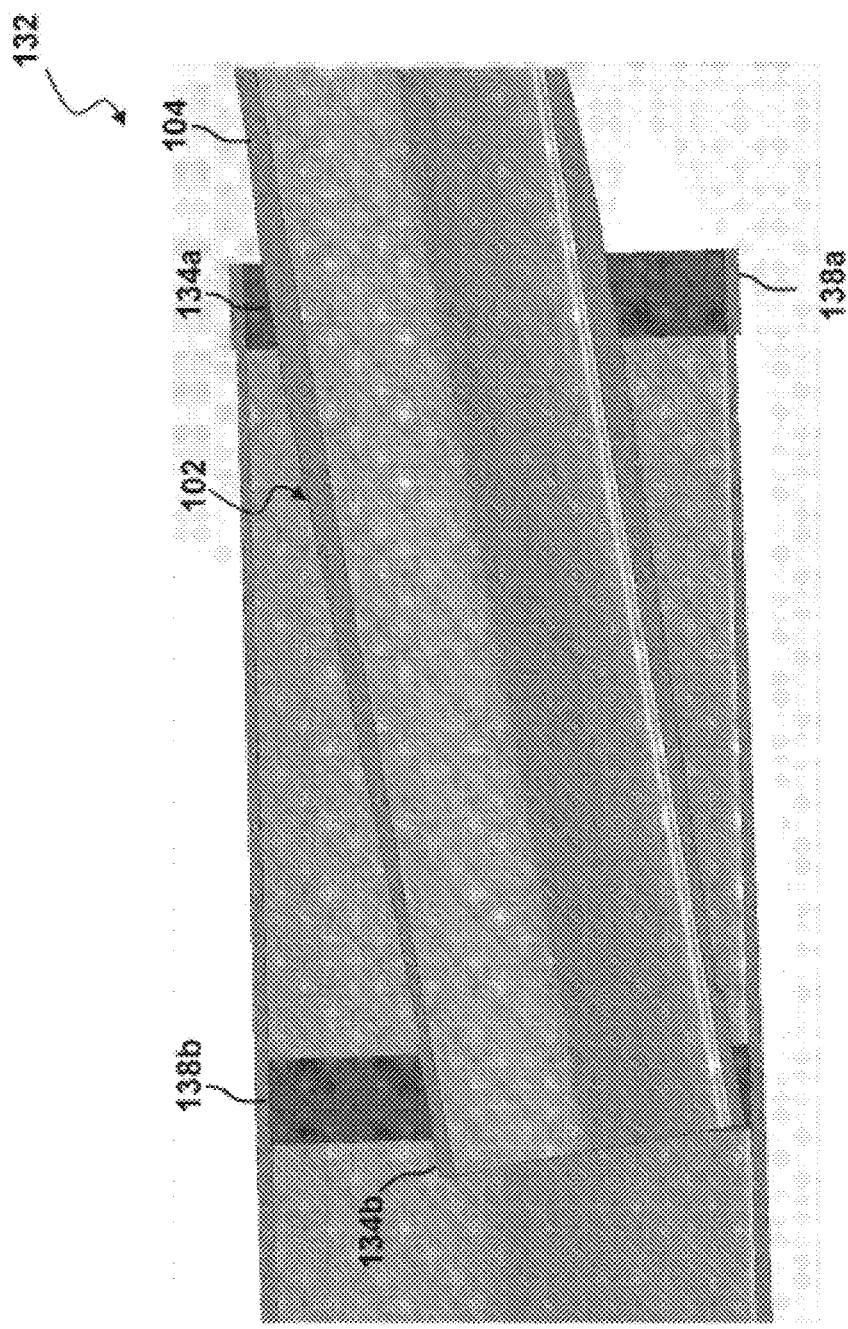
FIG. 4 depicts a cross-sectional view of a tubular spar joint between sections of the spar of FIG. 1.

With reference to FIG. 4, a wing panel spar joint 132 is illustrated. More specifically, the wing panel spar joint 132 may be located between two adjacent spar sections 134a,b of spar 102. In one embodiment, the two adjacent spar sections 134a,b have different diameters such that the end of one spar section can fit into the end of the other spar section with some clearance. For example, the diameter of section 134a may pan down to fit into section 134b. The distance that one spar section (e.g., section 134a) might protrude into the end of the adjacent spar section (e.g., section 134b) may be approximately 3 times the diameter of the smaller spar section. Bending moments may be transferred from one spar section to the other through a pair of annular spacers 138a,b, one at each end of the overlapping sections 134a,b, such the two spacers 138a,b are separated by a distance of approximately 3 times the diameter of the smaller spar section 134b. Each spacer 138a,b may include an outside diameter that just fits within the inside of the larger spar section 134a and a hole that fits securely around the outside of the smaller spar section 134b. In one embodiment, both spacers 138a,b are bonded to the outside of the smaller spar section 134b. In one embodiment, eccentric spacers may be used where the hole for the smaller spar section 134b is not in the center of the spacer 138b, such as when a dihedral break angle is desired at the wing panel spar joint 132.

With respect to FIG. 5, each spar section 134a,b may be constructed of lightweight, sandwich side walls and the honeycomb core 104 described above. For example, the spar 102 includes the upper cap 116, lower cap 118, and side walls comprised of the inner face sheet 122, the honeycomb core 104, and the outer face sheet 124. The upper cap 116 and lower cap 118 of each spar section 134a,b may be constructed of relatively thick layups of unidirectional carbon fiber and epoxy where the fibers are oriented along the length of the spar section 134a,b. Each cap 116,118 may occupy up to 90° of the circumference of the respective spar sections 134a,b. Each cap 116,118 may be sized to carry the required spar bending moment within predetermined cap stress thresholds. The caps of the smaller spar section 134b may be thicker than the caps of the larger spar section 134a, because both spars sections 134a,b carry approximately the same bending moment, yet the smaller spar section 134b must carrying the bending moment with less cap separation (and potentially less cap width). The thicknesses of each spar 116,118 may have a range from 0.01 inches to 0.50 inches. In one embodiment, the different cap 116,118 and side wall thicknesses produce outsides of the spar sections 134a,b that may me slightly eccentric and not cylindrical.

Along most of the length of the spar 102, the shear is modest and may be easily carried by the lightweight sandwich side walls, which may be sized for cap stability; however, the shear is high where the spar sections 134a,b overlap. This is because the force in a cap must ramp from full force where a spar section starts to overlap the other spar section to zero at the end of the spar section. The force may be transferred to the spar side walls within the overlap section as shear. The side walls in the overlap section must, therefore, be heavily reinforced. In one embodiment, the side walls are reinforced with a plurality of plies 136 having mostly ±45° orientation. The plies 136 may be wrapped around the full circumference of the spar 102 at the spar sections 134a,b to properly tie into the caps 116,118. The shear walls in the smaller section 134a may be thick enough that no honeycomb core 104 is required. In one embodiment, as load is transferred from the caps to the joiner shear wall, the cap cross-sectional area may ramp down to save weight.

At the two spacer locations 138a,b, the shear may be gathered up and transferred to the spacers 138a,b. The shear transfer may be facilitated by hoop plies 136a (shown in yellow), which are unidirectional plies having 90° orientation with respect to the spar 102 axis. In order to properly tie into joiner shear plies 136b (shown in green), the hoop plies 136a may be wrapped around the full circumference of the spar 102. The hoop plies 136a may be slightly wider than the spacers 138a,b, thus resulting in additional thickening of the spar tube wall. In one embodiment, of the smaller spar, the spacers 138a,b are bonded on top of (e.g., around) said thickened areas of the spar section 134b.

Generally speaking, the edges of the plies 136 are stepped, such that abrupt transitions may be avoided. Additionally, the different types of plies 136 are interleaved (e.g., mixed). In one embodiment, the interleaving may include a plurality of cap plies 136c (shown in blue), then a joiner shear ply 136b, then a hoop ply 136a, followed by additional cap plies 136c. In one embodiment, the cap plies 136c run relatively parallel to the spar 102. In one embodiment, wherever cap plies 136c are laid on top of the ramping edges of other plies (e.g., hoop plies 136a, joiner shear plies 136b), a small "joggle" is produced. The joggle may be tolerated in locations where the joggle is small and the overall layup of the plies 136 is thick. The hoop plies 136a may be biased toward the outside of the layup of the plies 136 to minimize such joggles that the hoop plies 136a may produce under the caps 116,118.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

The invention claimed is:

1. A system comprising:
    a wing panel;
    a spar disposed in the wing panel, wherein the spar comprises:
    an upper cap;
    a lower cap;
    a honeycomb core connected between at least a portion of the upper cap and the lower cap;
    an lower surface sheet; and
    an upper surface sheet, wherein
    at least a portion of the honeycomb core is disposed between the lower surface sheet and the upper surface sheet, and
    the spar is thicker at the upper cap than at the lower cap.

2. The system of claim 1, wherein the wing panel comprises a semi-rigid shell.

3. The system of claim 2, further comprising an unmanned aerial vehicle (UAV), wherein the wing panel is attached to the UAV.

4. The system of claim 2, wherein the honeycomb core and upper surface sheet go around an entire circumference of the spar.

5. The system of claim 1, further comprising an unmanned aerial vehicle (UAV), wherein the wing panel is attached to the UAV.

6. The system of claim 5, wherein the honeycomb core and upper surface sheet go around an entire circumference of the spar.

7. The system of claim 1, wherein the honeycomb core and upper surface sheet go around an entire circumference of the spar.

8. The system of claim 1, wherein the spar has a varying thickness.

9. The system of claim 1, wherein the honeycomb core provides stabilization to the spar between the upper cap and the lower cap.

10. The system of claim 1, wherein the honeycomb core stabilizes a cross section of the spar against flexing of a spar walls, such that the spar withstands positive and negative out-of-plane bending loads about a chordwise principal axis of the spar.

11. The system of claim 1, wherein the upper cap is distal from the lower cap.

12. The system of claim 1, wherein a cross section of the spar is oval.

13. The system of claim 1, wherein the upper cap and the lower cap are made of carbon fiber.

14. The system of claim 1, wherein the honeycomb core is made of aramid fibers.

15. A system comprising:
a wing panel;
a spar disposed in the wing panel, wherein the spar comprises:
an upper cap;
a lower cap;
a honeycomb core connected between at least a portion of the upper cap and the lower cap;
an lower surface sheet; and
an upper surface sheet, wherein
at least a portion of the honeycomb core is disposed between the lower surface sheet and the upper surface sheet, and
at least a portion of the honeycomb core and the upper surface sheet extend past at least one edge of the upper cap and overlap onto the upper cap.

16. The system of claim 15, wherein the wing panel comprises a semi-rigid shell.

17. The system of claim 15, further comprising an unmanned aerial vehicle (UAV), wherein the wing panel is attached to the UAV.

18. The system of claim 15, wherein the honeycomb core and upper surface sheet go around an entire circumference of the spar.

19. A system comprising:
a wing panel;
a spar disposed in the wing panel, wherein the spar comprises:
an upper cap;
a lower cap;
a honeycomb core connected between at least a portion of the upper cap and the lower cap;
an lower surface sheet; and
an upper surface sheet, wherein
at least a portion of the honeycomb core is disposed between the lower surface sheet and the upper surface sheet, and
at least a portion of the honeycomb core and the upper surface sheet extend past at least one edge of the lower cap and overlap onto the lower cap.

* * * * *